106-89

United States Patent Office 3,389,003
Patented June 18, 1968

3,389,003
METHOD OF PRODUCING CONCRETE OF IMPROVED STRENGTH
Eugene Gado, 18915 Detroit Ave., Lakewood, Ohio 44107
No Drawing. Continuation-in-part of application Ser. No. 441,845, Mar. 22, 1965. This application Aug. 10, 1966, Ser. No. 571,395
2 Claims. (Cl. 106—97)

ABSTRACT OF THE DISCLOSURE

Concrete of improved compressive strength is made by thoroughly grinding and homogenizing cement with 25–60% water and optionally sand, mixing with gravel and optionally more cement, sand or water, and adding a pre-hardened product. The pre-hardened product contains cement, water and other materials which are mixed, hardened, soaked in water and ground to fine powder.

---

This is a continuation-in-part application of my earlier United States patent application, Ser. No. 441,845, filed Mar. 22, 1965, now abandoned.

The present invention relates to a method of preparing concrete mixtures. Attempts have been made in the past to prepare concrete mixtures having improved compression strength and reduced hardening time. Various additives have been introduced into concrete mixtures in order to improve the setting and ultimate strength.

It is an object of the present invention to provide a concrete product having a substantially higher compression strength than produced from standard concrete mixtures.

It is an object of one aspect of the present invention to provide a concrete mixture by substantially homogenizing a premix of cement and water and adding the premix to a standard cement composition. In accordance with this aspect of the invention, cement, or cement and sand, are mixed with 25–60% by weight of water, based on the weight of cement, and they are ground and homogenized to form an agglomerate which is added to a concrete mixture of standard composition.

Another object of the present invention is to provide a hardened seeding material which is added to concrete to increase its compression strength. In accordance with this aspect of the invention, there are mixed cement; at least one material selected from the group consisting of pozzolana, ground, foamed basalt, quartz flour, sand and volcanic aggregate; trisodium phosphate and water. The mixture is allowed to harden to form a brick which is subjected to the action of a water bath and then ground into fine particles.

The term cement, as used herein, refers to portland cement or the like, as customarily used in the making of concrete. A full description of such materials will be found in the Encyclopedia of Chemical Technology, 2nd edition, volume 4, beginning at page 684. For example, portland cement is typically made by sintering a mixture of raw materials, one of which is composed mainly of calcium carbonate and the other of aluminum silicate. The clinkers resulting from sintering are pulverized with a small amount of gypsum.

The term concrete, as used herein, refers to a mixture of cement, sand and gravel or crushed stone. Typical proportions on a weight basis are 7–14% cement, 24–30% sand and 69–56% gravel or crushed stone.

Specific examples of some standard cement mixtures and concrete compositions can be found by referring to the text Industrial Chemistry, published by the Reinhold Publishing Corporation, beginning on page 160 of the 3rd edition.

The premix is made from cement or a mixture of cement and sand. The amount of sand, if used, is preferably 20–50% by weight of the cement for convenient homogenization in special homogenizing machines. However, it is possible to use an amount of sand as much as 2.5 times the weight of the cement, especially if larger mixing equipment is available. To the cement, or cement and sand, there is added 25–60% by weight of water, based on the weight of cement. The mixture is thoroughly ground and homogenized, then the resulting premix is added to concrete along with additional water to produce a concrete which is hardened in the known manner. The amounts used are about 2–10% premix and about 90–98% dry concrete mix. However, in computing the amount of cement and sand in the dry concrete to which the premix is added, a deduction is made for the amount(s) of these materials in the premix. The same deduction is made for the amount of water in the premix.

Example 1

There are mixed together 517 pounds of portland cement, 200 pounds fine sand and 200 pounds of water. These are thoroughly ground and homogenized. Separately there is prepared a concrete mixture containing 1070 pounds fine sand and 1940 pounds gravel. The premix is added to the concrete mixture together with 100 pounds water and they are mixed in the usual manner.

When hardened, it was found that the product had 21–26.5% higher compression strength than concrete prepared in the known manner, i.e., by simply mixing a standard formula dry concrete with water.

In accordance with another aspect of the invention, there is added to the concrete mixture, which is preferably prepared using the aforesaid premix, up to about 6% (preferably 0.1–6%) of a hardened, finely ground product. The finely ground product is made as follows: To 100 parts by weight of cement there is added (1) 5–40 parts by weight of pozzolana, ground, foamed basalt, quartz flour, sand or volcanic aggregate; (2) 0.1–3 parts by weight of trisodium phosphate and (3) 30–100 parts by weight of water. This material is thoroughly mixed and then it is hardened, preferably for at least 24 hours at room temperatures in brick-shaped forms. The hardened material is submerged in water until thoroughly soaked. Satisfactory results are obtained at room temperatures in 28 days although the time may be shortened by heating the water. For example, at 70° C. the bricks can be soaked for 3 days. The bricks are removed from the water and ground to a powder.

Example 2

There are mixed 100 parts by weight portland cement, 20–40 parts by weight pozzolana, 0.1–3 parts by weight trisodium phosphate and 35 parts by weight water. The mixture was thoroughly blended and poured into forms having the shape of bricks. After hardening for 24 hours at room temperature, the bricks were removed from the forms and submerged in water. After standing under water at room temperature for 28 days, the bricks were removed and ground to a fine powder. About 22 pounds of the powder were added to a dry concrete mixture containing 498 pounds portland cement, 1287 pounds sand, 1950 pounds gravel and 32 gallons water. After mixing thoroughly in the known manner for concrete, the material was hardened in the usual way. The amount of added product in this mix can desirably be in the range 15–30 pounds.

The same fine powder was combined with the material of Example 1 containing the premix concrete and added water. After thorough mixing in the known manner for concrete, the mixture was hardened.

Addition of this fine powder has been found by breakage tests to produce a 34–43% higher compression strength compared to concrete of standard composition.

The reason for increase in compression strength is not fully understood. However, it is known that one reason for the lack of compression strength in concrete, considering the amount of cement used, is that a plastic concrete, while appearing homogenized, has a high percentage of cement particles bedded or interbedded in gelatinoid substances rather than adequately dispersed throughout the mixture. In general, cement, used 7–15% of the aggregate, does not take part in the reaction totally. For this reason as much as a 40% excess of cement is often required to provide adequate strength in the resulting concrete. By obtaining a more homogeneous mixture, through use of the aforesaid premix, more uniform mixing is obtained and therefore higher strength. The fine powder produced from cement, pozzolana, basalt, quartz, sand or volcanic aggregate, trisodium phosphate and water is believed to try to regain its original crystal forms. Therefore, seeding the concrete with it is believed to contribute to the ultimate strength of the concrete.

I claim:
1. A method of preparing concrete which comprises thoroughly grinding and homegenizing pulverized portland cement with 25 to 60% by weight of the cement of water and 0–250% by weight of the cement of sand to produce a premix,
combining said premix with gravel or crushed stone and any additional amounts of cement and sand and water necessary to provide a concrete-forming mixture comprising, on a weight basis, 7–14 parts cement, 24–30 parts sand and 69–56 parts gravel or crushed stone, substantially all of said gravel or crushed stone being introduced after producing said premix,
adding to the concrete-forming mixture 0.1 to 6% by weight of the weight of cement of a composition produced by first mixing 100 parts by weight of cement; 5–40 parts by weight of a material selected from the groug consisting pozzolana, foamed basalt, quartz flour, sand and volcanic aggregate; 0.1–3 parts by weight trisodium phosphate and 30–100 parts by weight water, hardening the material in brick form and subsequently soaking the hardened material in water at a temperature of from room temperature to 70° C. for a period of 3 to 28 days, and grinding it to a fine powder,
and hardening the concrete-forming mixture.

2. A method of preparing a concrete composition as set forth in claim 1 in which the amount of sand in said pre-mix is about 20–80% by weight of said cement.

References Cited

UNITED STATES PATENTS

| | | | |
|---|---|---|---|
| 1,371,762 | 3/1921 | Hartner | 106—89 |
| 1,986,335 | 1/1935 | Halbach | 106—89 |
| 2,048,932 | 7/1936 | Hartvedt | 106—89 |
| 2,090,421 | 8/1937 | Larmour et al. | 106—89 |
| 2,564,619 | 8/1951 | Anderson | 106—89 |

FOREIGN PATENTS

| | | |
|---|---|---|
| 673,833 | 11/1963 | Canada. |
| 940,692 | 10/1963 | Great Britain. |

OTHER REFERENCES

Lea and Desch: The Chemistry of Cement and Concrete, published by Edward Arnold Ltd., London, 1956, 2nd edition, pages 287, 336, 340, 341, 491 and 512.

TOBIAS E. LEVOW, *Primary Examiner.*

S. E. MOTT, *Assistant Examiner.*